US012698065B1

(12) United States Patent　　　　　(10) Patent No.:　US 12,698,065 B1
Sura et al.　　　　　　　　　　　　　(45) Date of Patent:　　　Aug. 4, 2026

(54) PORTABLE RETRACTABLE SYSTEM AND METHOD FOR DEPLOYING WATER-BASED AND AIR-BASED SENSORS FROM A MARINE VESSEL

(71) Applicant: The United States of America, as Represented by the Secretary of the Navy, Arlington, VA (US)

(72) Inventors: Daniel A. Sura, San Diego, CA (US); Mark A. Patefield, San Diego, CA (US); Joseph A. Tuttobene, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 417 days.

(21) Appl. No.: 18/530,945

(22) Filed: Dec. 6, 2023

Related U.S. Application Data

(60) Provisional application No. 63/604,778, filed on Nov. 30, 2023.

(51) Int. Cl.
　　　B63B 49/00　　　　(2006.01)
　　　B63B 17/00　　　　(2006.01)
　　　　　　　(Continued)

(52) U.S. Cl.
　　　CPC ............. B63B 49/00 (2013.01); G01V 1/186 (2013.01); G01V 1/38 (2013.01); B63B 2017/0054 (2013.01); B63B 2213/02 (2013.01)

(58) Field of Classification Search
　　　CPC . B63B 49/00; B63B 17/00; B63B 2017/0054; B63B 2213/00; B63B 2213/02; G01V 1/186; G01V 1/38

(Continued)

(56) References Cited

U.S. PATENT DOCUMENTS 4,982,924 A　*　1/1991　Havins ................. G10K 11/006
　　　　　　　　　　　　　　　　　248/295.11
5,016,225 A　*　5/1991　Blomberg ............ G10K 11/006
　　　　　　　　　　　　　　　　　248/205.5
(Continued)

FOREIGN PATENT DOCUMENTS

CN　　106416101 A　　2/2017
CN　　109131742 A　*　1/2019　............. B63B 17/00
EP　　　2386064 B1　　8/2017

OTHER PUBLICATIONS

Dr. Ying-Tsong Lin, "Seafloor Survey Around the Atlantis II Seamounts Using an Autonomous Underwater Vehicle", Woods Hole Oceanographic Institution, Final Report, Jun. 30, 2023.
(Continued)

*Primary Examiner* — Daniel V Venne
(74) *Attorney, Agent, or Firm* — Naval Information Warfare; Paul C. Oestreich; Kyle Eppele

(57)　　　　　　ABSTRACT

The present invention includes portable, retractable systems and methods for simultaneously deploying water-based sensors and air-based sensors from a marine vessel. Embodiments of the system include a mounting frame assembly that is configured to clamp onto a gunwale of the marine vessel with both rough and fine adjustment to fit over and around any suitable gunwale thickness and surface contours. Embodiments of the system further include a retractable pole assembly that is rotationally coupled to the mounting frame assembly. The retractable pole assembly may be retracted and rotated to a horizontal position for adjustment, travel and stowing, or fully extended and rotated to a vertical position with a water-based sensor secured in the water at a bottom end and an air-based sensor secured at a top end.

21 Claims, 14 Drawing Sheets

(51) Int. Cl.
*G01V 1/18* (2006.01)
*G01V 1/38* (2006.01)

(58) Field of Classification Search
USPC ...................................... 114/343, 364; 440/6
See application file for complete search history.

(56) References Cited

U.S. PATENT DOCUMENTS

| | | | | |
|---|---|---|---|---|
| 5,186,050 | A | 2/1993 | Lagace et al. | |
| 9,016,225 | B1 * | 4/2015 | Jenkins | ................... B63B 21/26 |
| | | | | 114/294 |
| 9,063,249 | B2 | 6/2015 | Pearce et al. | |
| 9,588,246 | B2 | 3/2017 | Pearce | |
| 10,099,630 | B1 | 10/2018 | Krishnan et al. | |
| 10,649,105 | B1 | 5/2020 | Hamburg et al. | |
| 12,258,105 | B2 * | 3/2025 | Roller | .................... B63B 17/00 |
| 2021/0053660 | A1 | 2/2021 | Suresh et al. | |
| 2021/0371064 | A1 | 12/2021 | Boks et al. | |
| 2023/0131772 | A1 | 4/2023 | Gholson et al. | |

OTHER PUBLICATIONS

Tuttobene et al., Accurate Tracking and Unmanned Underwater Vehicle (UUV) Navigation (ATUN) Phase III Test Repeat and System Recommendation Activities Report, TR 3298, Dec. 22.

* cited by examiner

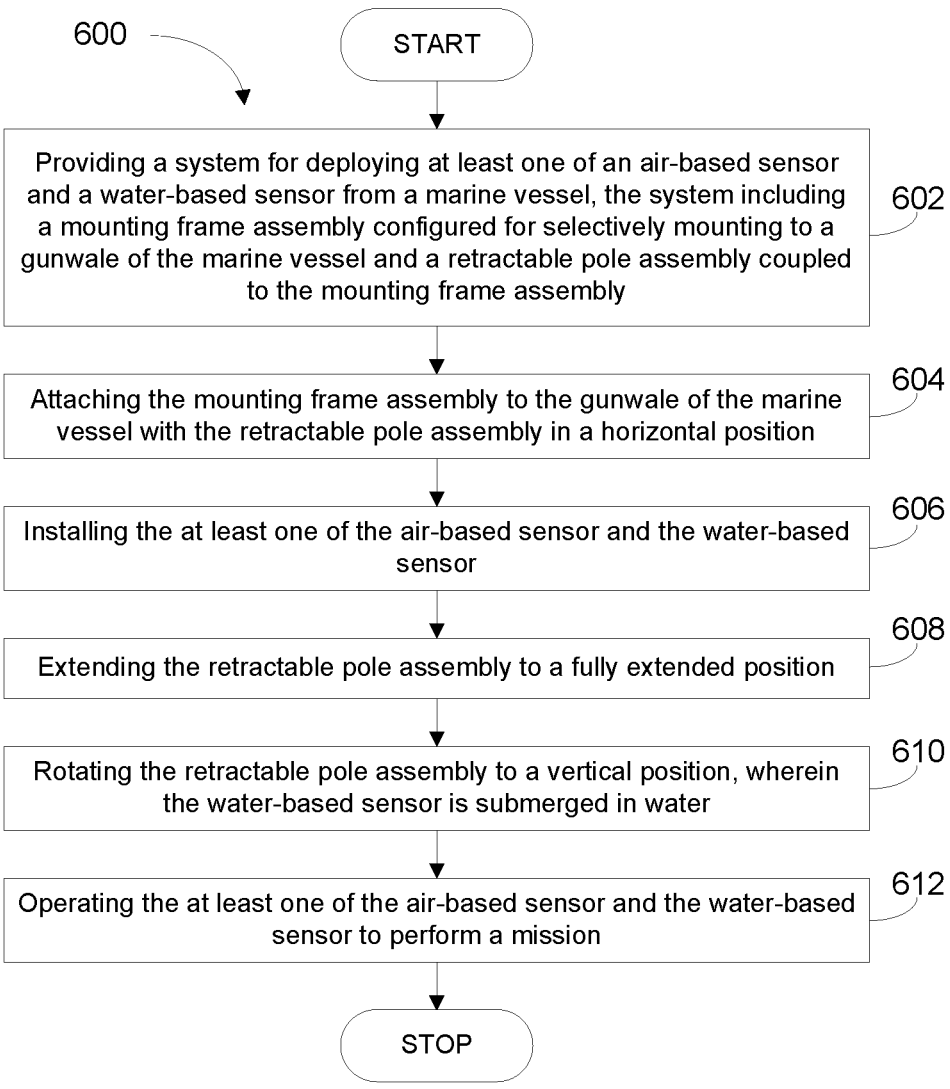

600

START

602

Providing a system for deploying at least one of an air-based sensor and a water-based sensor from a marine vessel, the system including a mounting frame assembly configured for selectively mounting to a gunwale of the marine vessel and a retractable pole assembly coupled to the mounting frame assembly

604

Attaching the mounting frame assembly to the gunwale of the marine vessel with the retractable pole assembly in a horizontal position

606

Installing the at least one of the air-based sensor and the water-based sensor

608

Extending the retractable pole assembly to a fully extended position

610

Rotating the retractable pole assembly to a vertical position, wherein the water-based sensor is submerged in water

612

Operating the at least one of the air-based sensor and the water-based sensor to perform a mission

STOP

*FIG. 16*

PORTABLE RETRACTABLE SYSTEM AND METHOD FOR DEPLOYING WATER-BASED AND AIR-BASED SENSORS FROM A MARINE VESSEL

CROSS-REFERENCE TO RELATED APPLICATIONS

This US Nonprovisional Patent Application claims benefit and priority to U.S. Provisional Patent Application No. 63/604,778, filed Nov. 30, 2023, titled: "PORTABLE RETRACTABLE SYSTEM AND METHOD FOR DEPLOYING WATER-BASED AND AIR-BASED SENSORS FROM A MARINE VESSEL", now expired. The contents of the above-referenced patent application is hereby incorporated by reference for all purposes.

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice: (619) 553-5118; email: NIWC_Pacific_T2@navy.mil. Reference Navy Case Number 211381.

BACKGROUND OF THE INVENTION

Field of the Invention

The present invention relates generally to assemblies used to mount sensors to vehicles. More particularly, embodiments of the present invention find application in a maritime context for attaching air-based and water-based sensors to marine vessels. Still more particularly, the present invention relates to portable, retractable systems and methods for deploying underwater and air-based sensors from a marine vessel.

Description of Related Art

It is not uncommon for marine vessels to carry various kinds of sensors and/or transmitters for use in air or underwater. For example, various underwater sensors/transmitters may include sonars, Doppler velocimetry loggers (DVLs), underwater acoustic modems, etc., useful on a marine vessel. Likewise there are many types of air-based transceivers, e.g., global positioning system (GPS) receivers, global navigation satellite system (GNSS) receivers, accelerometers, compasses, wind-speed gauges, etc., that find application on a marine vessel.

One particular underwater sensor is the ultra-short baseline (USBL) underwater acoustic sensor. USBLs may be used to track underwater objects, e.g., an unmanned undersea vehicle (UUV). In general, a USBL includes a surface transceiver unit and a subsea transponder. USBLs are typically used in pairs, e.g., one subsea USBL transponder would be mounted to the UUV and one surface transceiver deployed from the marine vessel on the surface to track the UUV. In a typical scenario, the surface transceiver emits a periodic acoustic pulse and awaits an acoustic acknowledgement from the subsea transponder on the UUV. When the surface transceiver receives this acknowledgement, it can calculate the range and bearing between the two USBL devices. This range can then be reported to topside operators as relative and/or real-world positions of the subsea transponder.

In a standard USBL configuration, the surface USBL transceiver may be coupled to a GPS receiver and compass, or a GNSS, operated near the surface of the water to serve as a reference point during tracking. Coupling the surface USBL transceiver with a GNSS provides increased positional tracking accuracy. So, it is advantageous to keep the surface USBL transceiver and GNSS near each other and securely mounted.

Ideally, the surface USBL transceiver should be deployed a fair distance below the water surface (2 m or more) to avoid performance degradation from acoustic reflections from the surface of the water (surface noise) and increased reception of position fix signals. In ideal conditions with no currents it would be possible for the operator to simply dangle a USBL from the side of the marine vessel and thus track the UUV with its counterpart USBL. However, in practice one may encounter challenging sea states and currents that may cause the surface USBL transceiver to move. This USBL motion decreases the accuracy of angular measurements and increases positional error, both of which impact tracking performance.

In view of the foregoing and for other reasons that will become more clear, there exists a need in the art for improved systems and methods for deploying underwater and air sensors from a marine vessel, especially in the presence high sea states.

SUMMARY OF THE INVENTION

An embodiment of a system for deploying air-based and water-based sensors from a marine vessel is disclosed. This system may include a mounting frame assembly configured for selectively mounting to a gunwale of the marine vessel. This system may further include a retractable pole assembly having a top end and a bottom end. The retractable pole assembly may be coupled to the mounting frame assembly and be configured to selectively receive an air-based sensor at the top end and a water-based sensor at the bottom end.

An embodiment of a method for deploying air- and water-based sensors from a marine vessel is disclosed. The method may include providing a system for deploying at least one of an air-based sensor and a water-based sensor from a marine vessel. According to one embodiment, the deployable system may include a mounting frame assembly configured for selectively mounting to a gunwale of the marine vessel. According to this particular embodiment, the deployable system may further include a retractable pole assembly. One embodiment of the retractable pole assembly may include a top end configured to selectively receive the air-based sensor. This embodiment of the retractable pole assembly may further include a bottom end configured to selectively receive the water-based sensor. This embodiment of the retractable pole assembly may further include the retractable pole assembly coupled to the mounting frame assembly. The method may further include attaching the mounting frame assembly to the gunwale of the marine vessel with the retractable pole assembly in a horizontal position. The method may further include installing the at least one of the air-based sensor and the water-based sensor. The method may further include extending the retractable pole assembly to a fully extended position. The method may further include rotating the retractable pole assembly to a vertical position, wherein the water-based sensor is submerged in water.

BRIEF DESCRIPTION OF THE DRAWINGS

The following drawings illustrate exemplary embodiments for carrying out the invention. Like reference numerals refer to like parts in different views or embodiments of the present invention in the drawings.

FIG. 16 is a flowchart of an embodiment of a method of deploying at least one of an air-based sensor and a water-based sensor from a marine vessel, according to the present invention.

DETAILED DESCRIPTION

Figure 1:
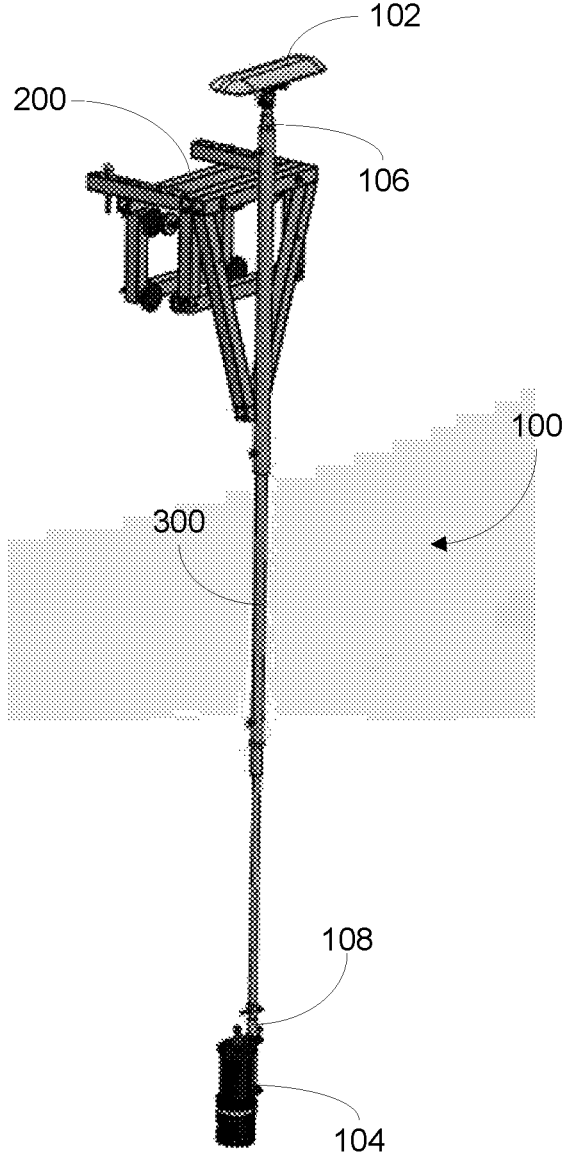
FIG. 1 is a perspective view of a portable, retractable system for deploying underwater and air sensors from a marine vessel, according to the present invention.

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless specifically otherwise stated.

Embodiments of the present invention include a portable, retractable system and method for deploying underwater and air sensors from a marine vessel. For illustration purposes only, the underwater sensor described herein is a USBL transceiver and the air sensor is a GNSS. This particular combination of air and water-based sensors is particularly useful to the US Navy in tracking UUVs. However, it will be understood that the embodiments of a portable retractable system and method described herein may be used with any suitable air-based or water-based sensors for mounting to a marine vessel for any particular application, not just UUV tracking.

The inventors encountered various technical problems in using USBLs to track UUVs that led to the advantageous features of the of the portable retractable system embodiments disclosed herein. First, is the preferred depth of the underwater deployment of the USBL transceiver, at least 1 m and preferably 3 m below the water surface. The water-based sensor should be neither too close to the water surface nor too deep to be unwieldy. Second, it is preferable to rigidly mount the USBL transceiver to the marine vessel in order to reduce USBL motion and improve performance accuracy. However, it is disadvantageous from an operational perspective to have a rigid structure extending from the marine vessel during transit. This is because drag caused by an underwater structure holding the USBL transceiver and the transceiver itself limits maneuverability and speed. For example, there may be instances in an operational context where the UUV being tracked may be out of range, or if the marine vessel must respond quickly to an incident such as snagged UUV or UUV dead in the water at the surface.

In order to solve this combination of technical problems, the embodiments of the mounting system disclosed herein are configured with portable and removable rigid mounting to a marine vessel. The mounting system further features a telescoping pole for extending and retracting the USBL transceiver into and out of the water. The mounting system further features a mechanism for pivoting the USBL transceiver out of the water for transport and when otherwise not in use. Finally, the mounting system is also configured with a flexible mounting system for the air-based GNSS that works in tandem with the water based USBL acoustic sensors. The invention features quick and easy operation with few or even no tools, because operation in adverse conditions such as heavy sea seas (high sea states) makes installation of equipment/sensors very difficult both during deployment and retrieval. This invention allows the operator to very quickly remove the tie downs, pivot the system to its horizontal position, temporarily tie it down and head to the incident quickly without needing to entirely remove the system from the marine vessel gunwale.

Prototype embodiments of the present invention along with its initial application and development for use in UUV tracking are further described in a counterpart technical publication, namely, Tuttobene et al., "Accurate Tracking and Unmanned Underwater Vehicle (UUV) Navigation (ATUN) Phase III Test Repeat and System Recommendation Activities Report", Naval Information Warfare Center Pacific, Technical Report 3298, December 2022. The contents of Technical Report 3298 are hereby incorporated by reference for all purposes as if fully set forth herein. Having provided a high-level overview of the invention, additional detailed description follows.

Referring now to the drawings, FIG. 1 is a perspective view of a portable, retractable system 100 for deploying underwater and air sensors from a marine vessel in a fully extended vertical configuration, according to the present invention. As shown in FIG. 1, system 100 may include a mounting frame assembly 200 coupled to a retractable pole assembly 300 featuring an air-based sensor 102 and a water-based sensor 104, each sensor mounted to opposite ends of the retractable pole assembly 300. According to a particular embodiment, air-based sensor 102 may be a GNSS mounted to the top end 106 of the retractable pole assembly 300. For example and not by way of limitation, air-based sensor 102 may be an Advanced Navigation™ GNSS Compass, available from Advanced Navigation, Level 12, 255 George Street, Sydney NSW 2000, Australia. According to another embodiment, water-based sensor 104 may be USBL transceiver mounted to the bottom end 108 of the retractable pole assembly 300. With this overview of the system 100 components, further description of system 100 and its features and various configurations follows.

Figure 2:
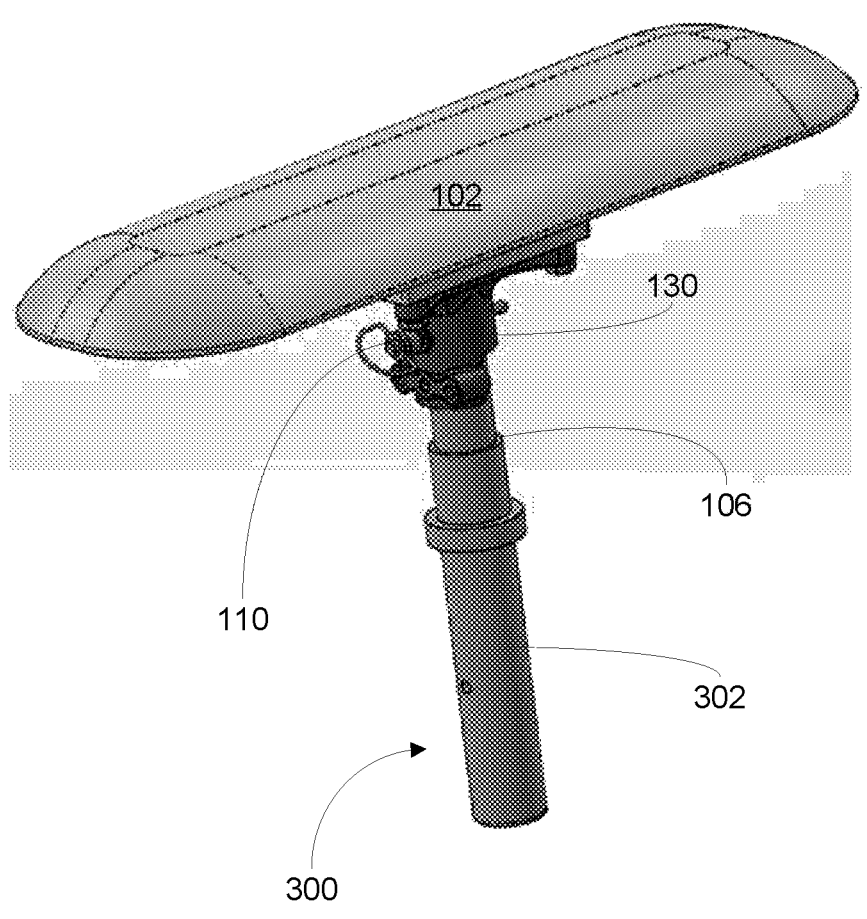
FIG. 2 is an enlarged perspective view of an air-based sensor portion of the system shown in FIG. 1, according to the present invention.

FIG. 2 is an enlarged perspective view of an embodiment of an air-based sensor 300 portion of the system shown in FIG. 1, according to the present invention. As noted above, a particular embodiment of the air-based sensor 102 may be a GNSS mounted to the top end 106 of the retractable pole assembly 300. The air-based sensor 102 may be secured to the top end 106 of the retractable pole assembly 300 using quick release pin 110 as illustrated in FIG. 2. For example, and not by way of limitation, FIG. 2 illustrates an air-based sensor mount 130 configured to selectively attach an air-based sensor 102 to the top end 106 of the upper pole of 302 of the retractable pole assembly 300. The air-based sensor 102 may be removed from the top end 106 of retractable pole assembly 300 by selectively removing quick-release pin 110 and reinstalled by performing the reverse. It will be understood that any suitable means for securing the air-based sensor 102 to the top end 106 of the retractable pole assembly 300 may be employed consistent with the teaching of the present invention, for example and not by way of limitation, bolts, clamps, threaded attachment, welding, glue, etc. The use of a quick release pin 110 has the advantage of being both quick and secure as well as providing an automatic alignment of the sensor 102 relative to the pole assembly 300.

Figure 3B:
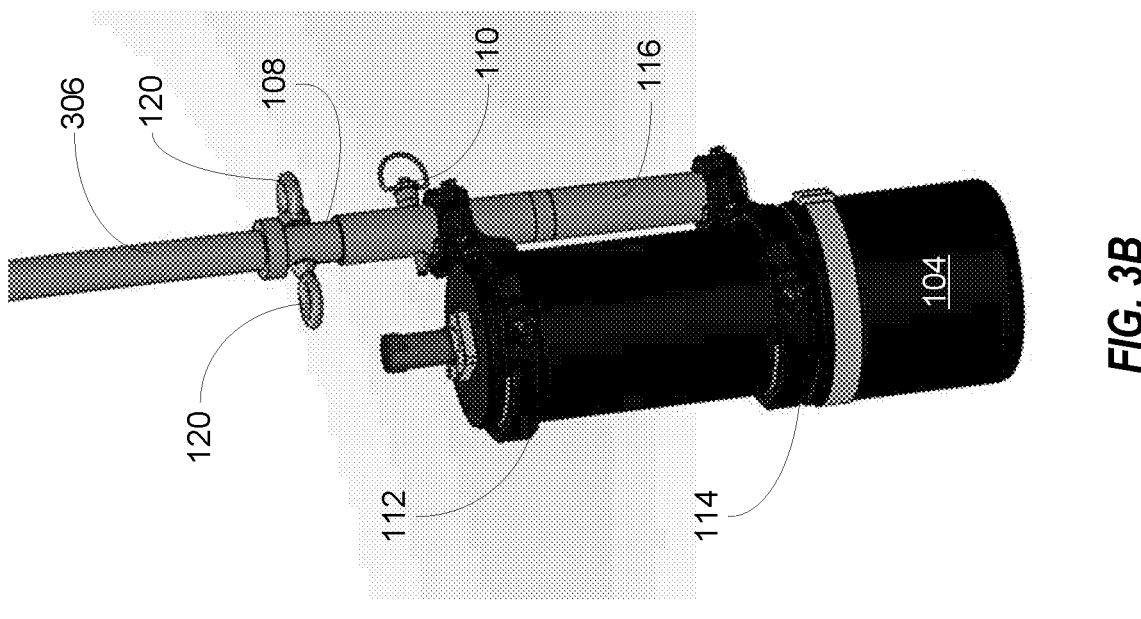
FIGS. 3A and 3B are perspective views of an embodiment of a water-based sensor, unmounted and mounted, respectively, to a bottom end of the retractable pole assembly of the system shown FIG. 1, according to the present invention.
Figure 3A:
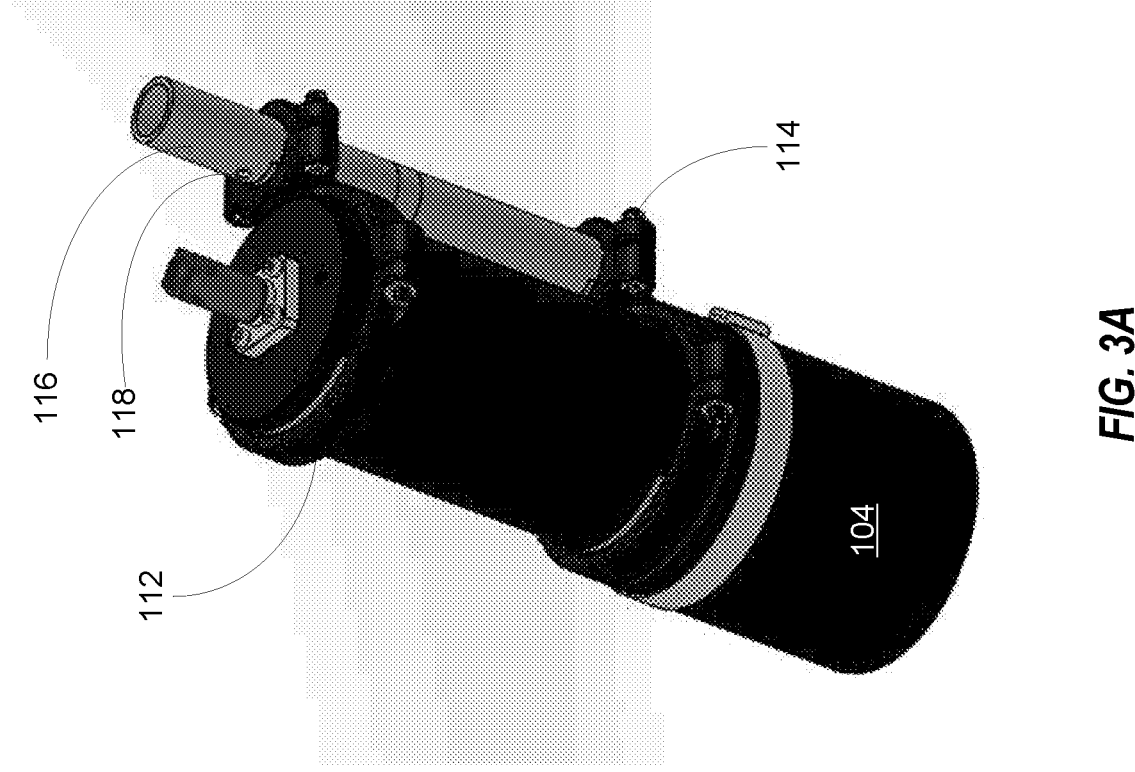

FIGS. 3A and 3B are perspective views of an embodiment of a water-based sensor 104, unmounted and mounted, respectively, to a bottom end 108 of the retractable pole assembly 300 of the system 100 shown FIG. 1, according to the present invention. According to the illustrated embodiment, the unmounted water-based sensor 104 shown in FIG. 3A may include upper 112 and lower 114 clamping brackets to selectively secure the sensor 104 to a water-based sensor mounting sleeve 116. Embodiments of the water-based sensor mounting sleeve 116 may be configured to slide over, and be secured to, the bottom end 108 of the retractable pole assembly 300 via quick release pin 110. Proper alignment of the sensor 104 relative to the bottom end 108 of the retractable pole assembly 300 may be achieved by quick release pin holes 118 (one visible in FIG. 3A) having axes perpendicular to the longitudinal axis of bottom end 108 of assembly 300. Of course, it will be understood that the bottom end 108 of assembly 300 further includes a matching set of quick release pin holes (not visible in FIG. 3A or 3B) also having axes perpendicular to the longitudinal axis of bottom end 108. Adjacent to or near the bottom end 108 of lower pole 306 are a couple of oppositely mounted eyelets 120 used for securing the bottom end 108 to vessel structure, such as cleats located on a gunwale using a tie down strap. The cleats, gunwale and tie down straps are not shown in FIG. 3B. However, such structural features are shown and explained in greater detail herein, see for example in FIGS. 11-13.

Figures 4, 5, 6:
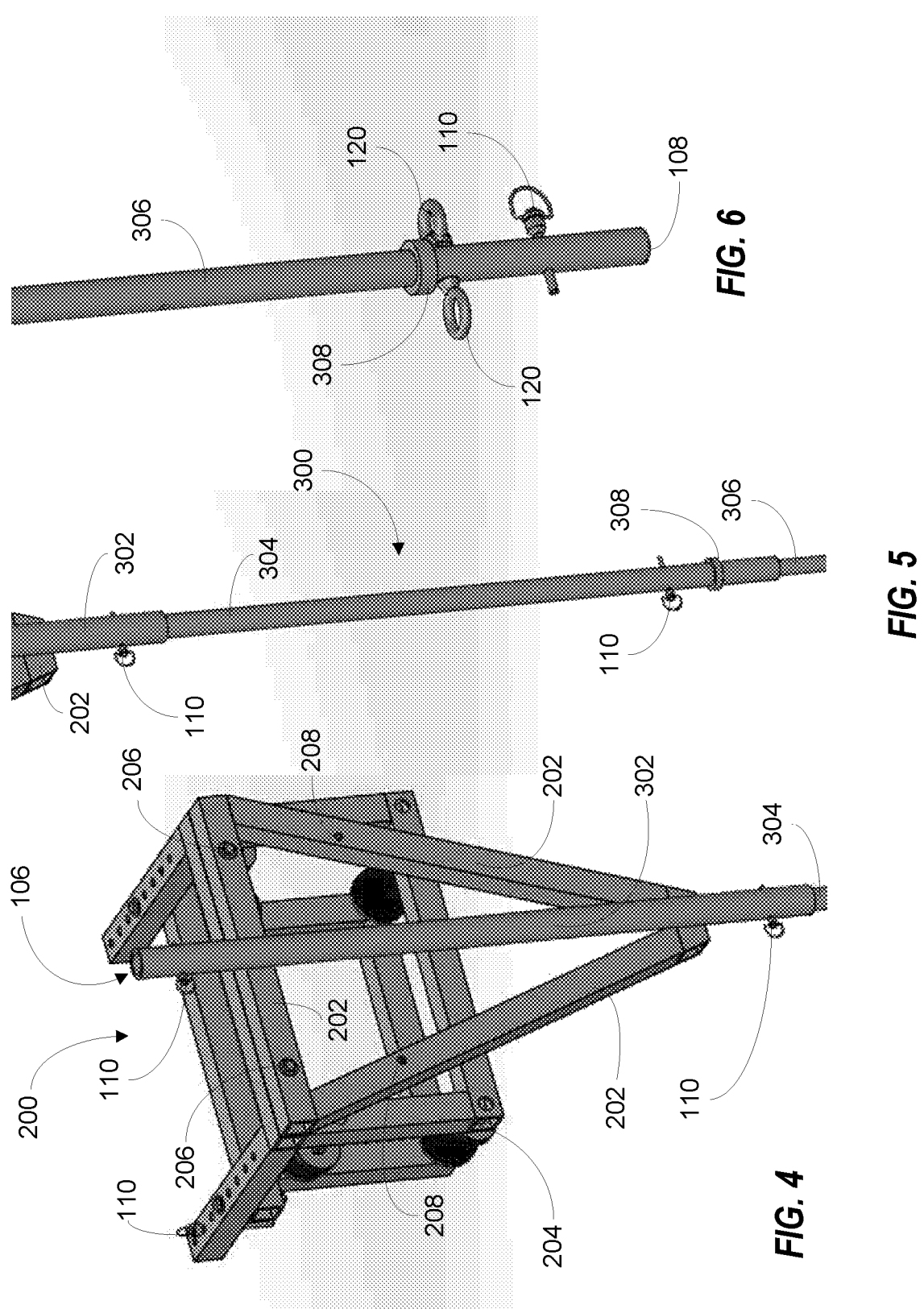
FIG. 4 is an enlarged perspective view of a mounting frame and upper pole of the system shown in FIG. 1, according to the present invention.
FIG. 5 is an enlarged perspective view of the retractable pole assembly of the system shown in FIG. 1, according to the present invention.
FIG. 6 is an enlarged perspective view of the bottom end of the lower pole of the system shown in FIG. 1, according to the present invention.

FIG. 4 is an enlarged perspective view of a mounting frame assembly 200 and upper pole 302 of the system 100 shown in FIG. 1, according to the present invention. According to one embodiment, the upper pole 302 may be welded to rotating frame 202. However, other embodiments may employ bolting, clamping and other suitable means for affixing the upper pole 302 to the rotating frame 202. Mounting frame assembly, shown generally at arrow 200, may be rotationally coupled to the rotating frame 202 as further described with reference to FIGS. 7A and 7B and related description herein. As illustrated in FIG. 4, a quick release pin 110 may be used to selectively align and couple the upper pole 302 to a middle pole 304. By releasing the quick release pin 110, the middle pole 304 (only a portion visible in FIG. 4) may be retracted into upper pole 302. According to a couple embodiments of system 100, rotating frame 202 may be rotationally coupled to mounting frame assembly 200 via either of the two pivoting and locking bolts 206. FIG. 4 further illustrates embodiments of holes 208 (two shown) formed in rotating frame 202 and configured to receive a quick release pin 110 used to secure the rotating frame 202 in a lateral position after rotation from the vertical position for transportation when system 100 is not in use. Note that in FIG. 4 a quick release pin 110 is not shown in either hole 208. However, a quick release pin 110 for this purpose may be stowed in mounting frame assembly 200 when not in use (see quick release pin 110 in the upper left corner). The upper center quick release pin 110 may be used to align and secure an air-based sensor 102 (not shown in FIG. 4) inserted into top end 106 of retractable pole assembly 300, and more particularly upper pole 302.

FIG. 5 is an enlarged perspective view of the retractable pole assembly 300 of the system 100 shown in FIG. 1, according to the present invention. More particularly, FIG. 5 illustrates a portion of rotating frame 202 connected to upper pole 302, which in turn is connected to middle pole 304 via quick release pin 110. Towards the lower end of FIG. 5, lower pole 306 is aligned and connected to middle pole 304 via another quick release pin 110. Middle pole 304 may also be configured with a collet 308 to limit sliding of middle pole 304 into upper pole 302 during retraction for stowing or during marine vessel travel.

FIG. 6 is an enlarged perspective view of the bottom end 108 of the lower pole 306 of the system 100 shown in FIG.

1, according to the present invention. Note that lower pole 306 also includes a collet 308 to limit retraction into the middle pole 304 during stowing and transportation. Eyelets 120 (two shown in FIG. 6) affixed toward the bottom end 108 of the lower pole 306 may be included in system 100 for use with tie-down straps (not shown). It will be understood that the length and number of pole segments as described herein may be varied for particular applications and for user preference without departing from the scope of the present invention. For the particular application described herein and in Technical Report 3298, a water-based sensor depth of about 3 m may be preferred during operation. Note that this particular depth is recommended by the manufacturer of a particular water based sensor, namely, an EvoLogics™, S2C R 18/34 USBL underwater acoustic modem, available from EvoLogics GmbH, Wagner-Régeny-Straße 4, 12489 Berlin, Germany. Again, it will be understood that other water-based sensors may require a different depth and the present invention is not limited by underwater depth.

Figures 7A, 7B:
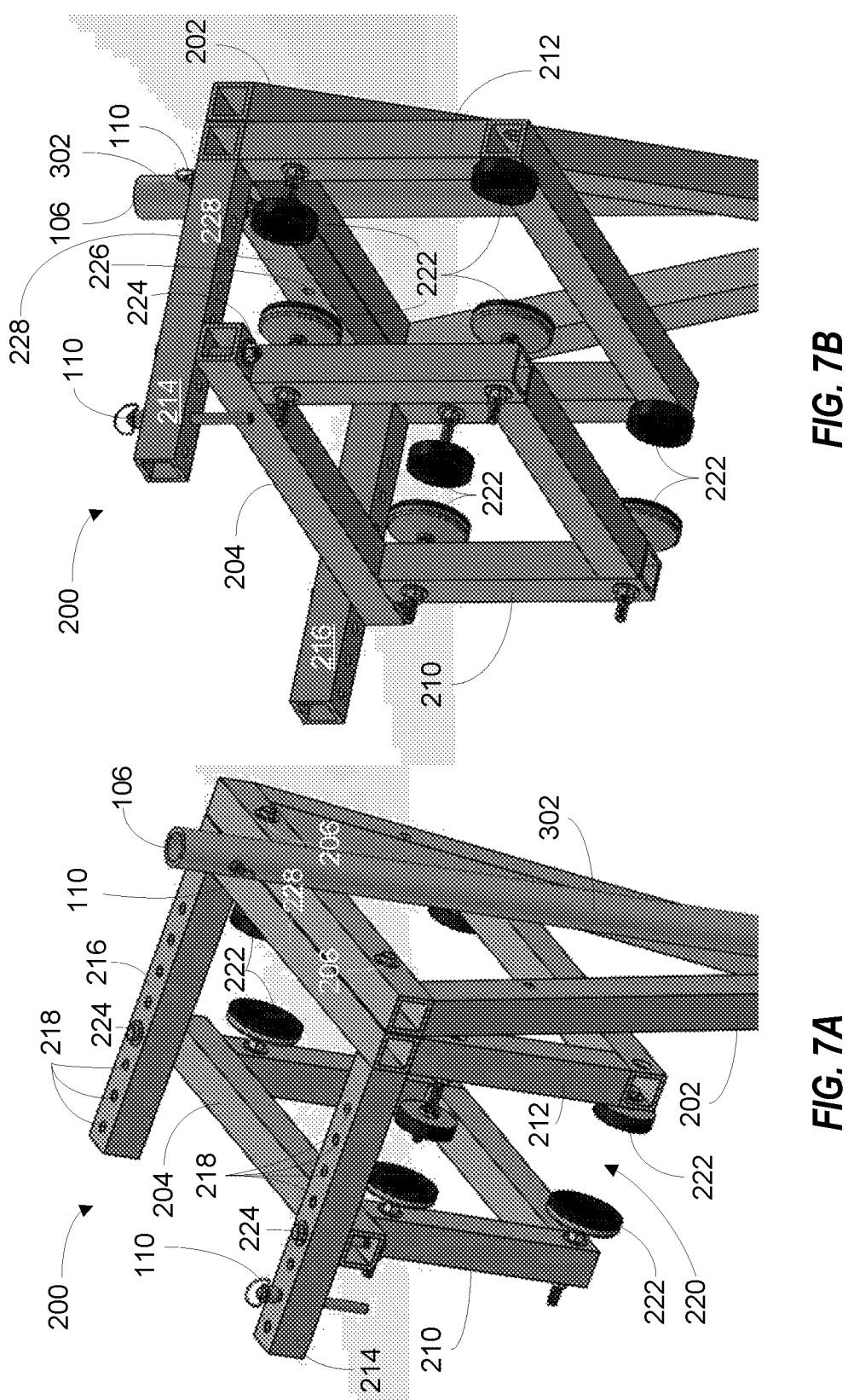
FIGS. 7A and 7B are further enlarged perspective views of a mounting frame assembly of the system shown in FIG. 1, according to the present invention.

FIGS. 7A and 7B are further enlarged perspective views of a mounting frame assembly 200 of the system 100 shown in FIG. 1, according to the present invention. According to the illustrated embodiment, mounting frame assembly 200 may include an inner rack 210 adjustably spaced apart from an outer rack 212. The space, shown generally at arrow 220 in FIG. 7A, located between the inner 210 and outer 212 racks forms the region of the mounting frame assembly 200 that can receive a gunwale (not shown) of a marine vessel (also not shown) for attachment thereto. According to the illustrated embodiment, the inner rack 210 may be adjustably spaced apart, and parallel to, the outer rack 212 via left 214 and right 216 adjustment beams connected to upper portions of racks 210 and 212. Each adjustment beam 214 and 216 may include a plurality of adjustment holes 218 to which the upper portion 204 of inner rack 210 may be secured using nuts and/or bolts 224 as shown in FIGS. 7A and 7B. By using selective placement of the inner rack 210 relative to the outer rack 212 using adjustment holes 218, rough adjustment of the space 220 may be achieved.

Fine adjustment of space 220 may be achieved using swivel pads 222 threaded to corners of each rack 210 and 212 as shown in FIGS. 7A and 7B. Each swivel pad 222 is configured to be axially adjustable (via bolt threading) such that it rests against a surface of a marine vessel gunwale (not shown in FIGS. 7A and 7B), thereby providing fine lateral adjustment. It will be further understood that because the pads 222 are configured to swivel, most any conceivable gunwale 402 surface contour, not just planar surfaces, may be accommodated with a secure friction fit. FIGS. 7A and 7B also illustrate two pivoting and locking bolts 206 used to secure the rotating frame 202 to the outer rack 212 in the vertical or deployed configuration. By removing one of the pivoting and locking bolts 206, the rotating frame 202 may be rotated 90° to a horizontal or stowed configuration and then relocked as shown for example in FIGS. 8B, 9A, 9B, 14A, 14B, 15A and 15B, and as described herein. FIGS. 7A and 7B further illustrate top end 106 of upper pole 302 with its quick release pin 110 used to secure an air-based sensor 102 (not shown in FIG. 7A or 7B). FIG. 7B also illustrates a through hole 226 located in the upper portion 228 of the outer rack 212 which is configured to receive one of the pivoting and locking bolts 206 when the rotating frame 202 is configured in the horizontal or stowed position.

According to other embodiments of system 100 (not illustrated but inherent to the illustrations of the invention), quick release pins 110 may also be used to temporarily lock the rotating frame 202 in its horizontal position. Similarly, there may also be instances during heavy seas where an operator can also pivot the rotating frame 202 from the horizontal position and use a quick release pin to lock it in the vertical position. While use of pivoting and locking bolts 206 generally provides a more secured "lock" in the horizontal or vertical position, there may be instances in heavy seas where use of bolts 206 and associated nuts and wrenches (all easily dropped) becomes difficult and using quick release pins 110 is preferred.

Figures 8A, 8B:
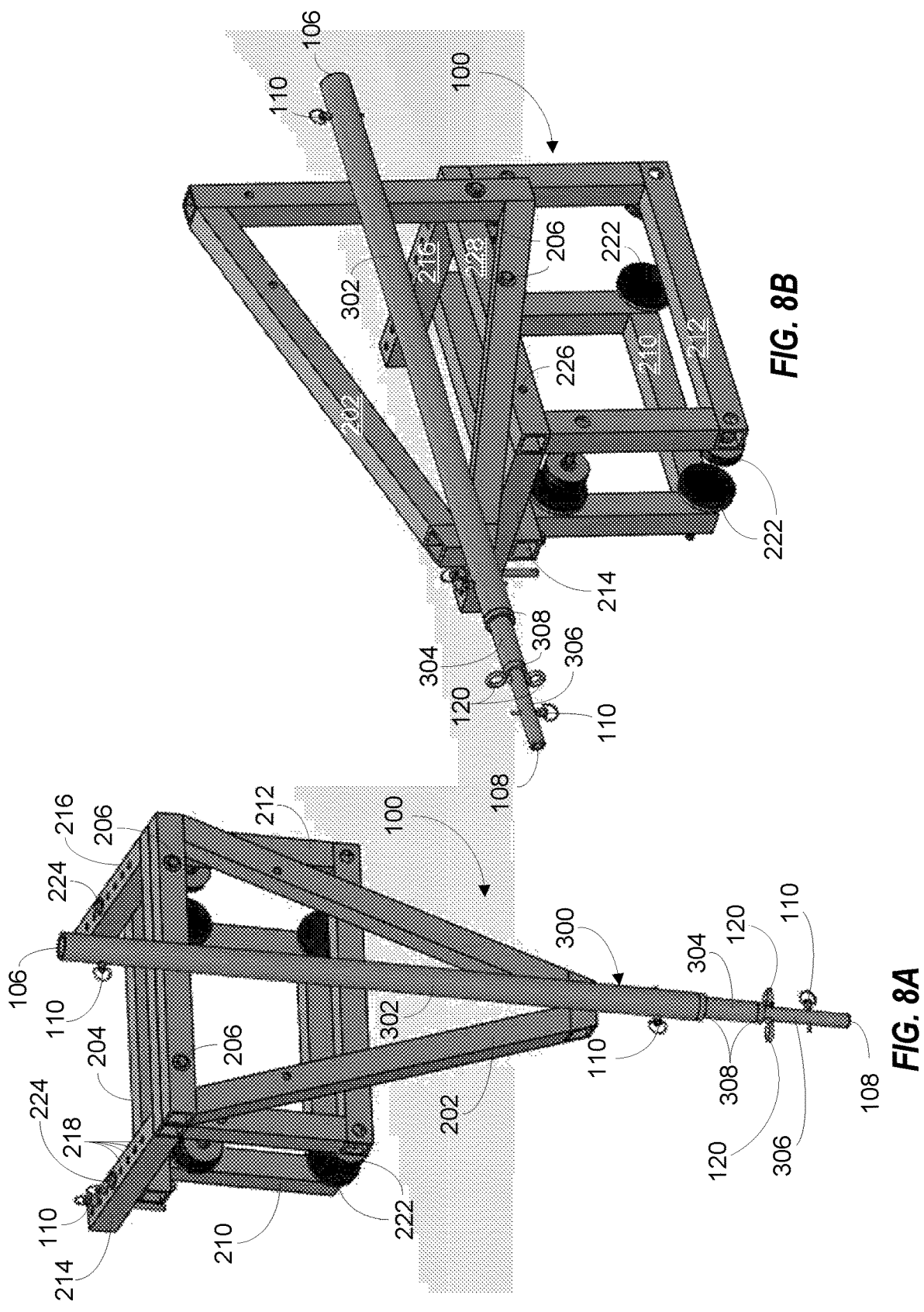
FIG. 8A is a perspective view of the system shown in FIG. 1 without sensors attached in the vertical and retracted position, according to the present invention.
FIG. 8B is a perspective view of the system shown in FIG. 1 without sensors attached in the horizontal and retracted position, according to the present invention.

FIG. 8A is a perspective view of the system 100 shown in FIG. 1 without sensors 102 and 104 attached in the vertical and retracted position, according to the present invention. FIG. 8B is a perspective view of the system 100 shown in FIG. 1 without sensors 102 and 104 attached in the horizontal and retracted position, according to the present invention. Both FIGS. 8A and 8B illustrate retractable pole assembly 300 with both middle 304 and lower 306 poles retracted within upper pole 302. Either position illustrated in FIGS. 8A and 8B may be useful during transportation or stowing of system 100, whether mounted or unmounted to a marine vessel gunwale (not shown). When mounted to a marine vessel gunwale and by retracting the retractable pole assembly 300 alone or in combination with rotation to the horizontal position, any water-based sensors 104 may be removed from the water and thus allow the marine vessel to traverse water without the drag that would otherwise be present.

As shown in FIG. 8B, one of the two pivoting and locking bolts 206 has been moved and reattached to outer rack 212 via through hole 226 (not visible in FIG. 8B, but see FIG. 7B). It will be understood that because of symmetry, the rotating frame 202 could be rotated clockwise 90° (as shown) or counterclockwise 90° depending on user preference by selective removal and replacement of one of the two pivoting and locking bolts 206. When system 100 is mounted on the gunwale of a marine vessel, the vertical position shown in FIG. 8A and the horizontal position shown in FIG. 8B are both useful for allowing a user to install or uninstall an air-based sensor 102 (not shown). However, the horizontal and retracted position of system 100 shown in FIG. 8B may be the most convenient for installing or uninstalling a water-based sensor 104 (not shown). It will be understood that upper portion 228 (see FIG. 8B) of outer rack 212 has at least three through holes 226 (one visible in FIG. 8B), two of them spaced apart from one another for use in securing the rotating frame 202 in the vertical position with two pivoting and locking bolts 206 and a third centrally located through hole 206 (not visible in FIG. 8B) but configured to receive one of the two pivoting and locking bolts 206 in a horizontal position.

Figure 9A:
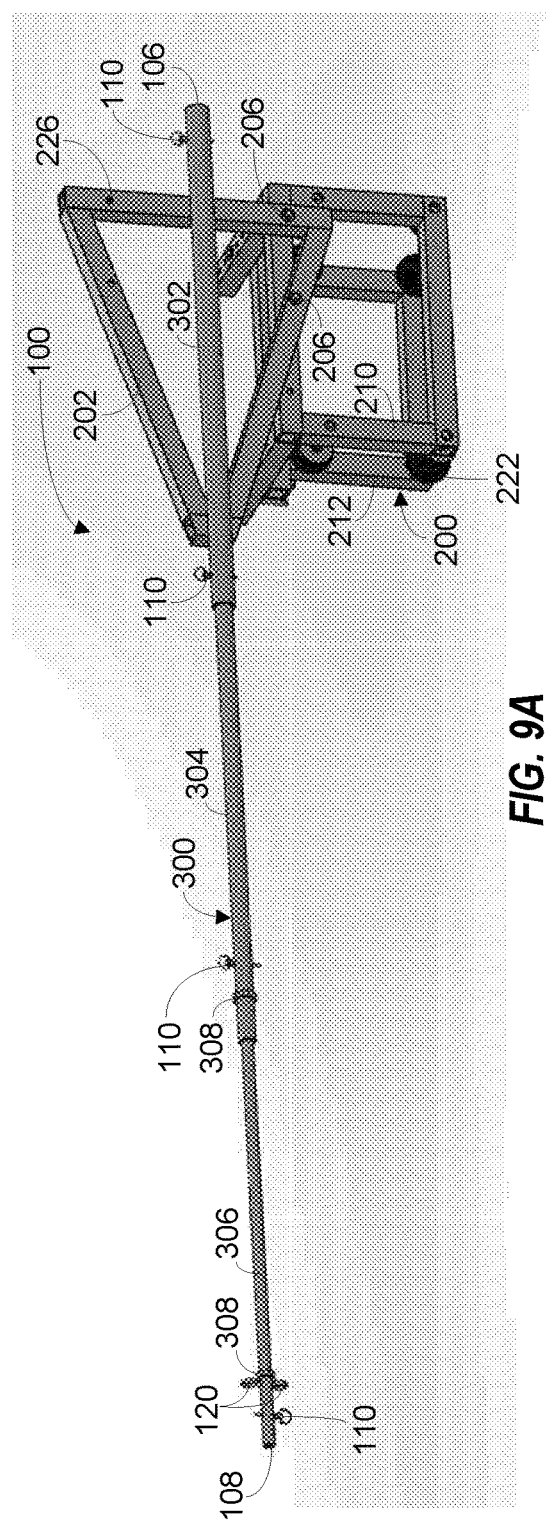
FIG. 9A is a perspective view of the system shown in FIG. 1 without sensors and attached in the horizontal and fully extended position, according to the present invention.
Figure 9B:
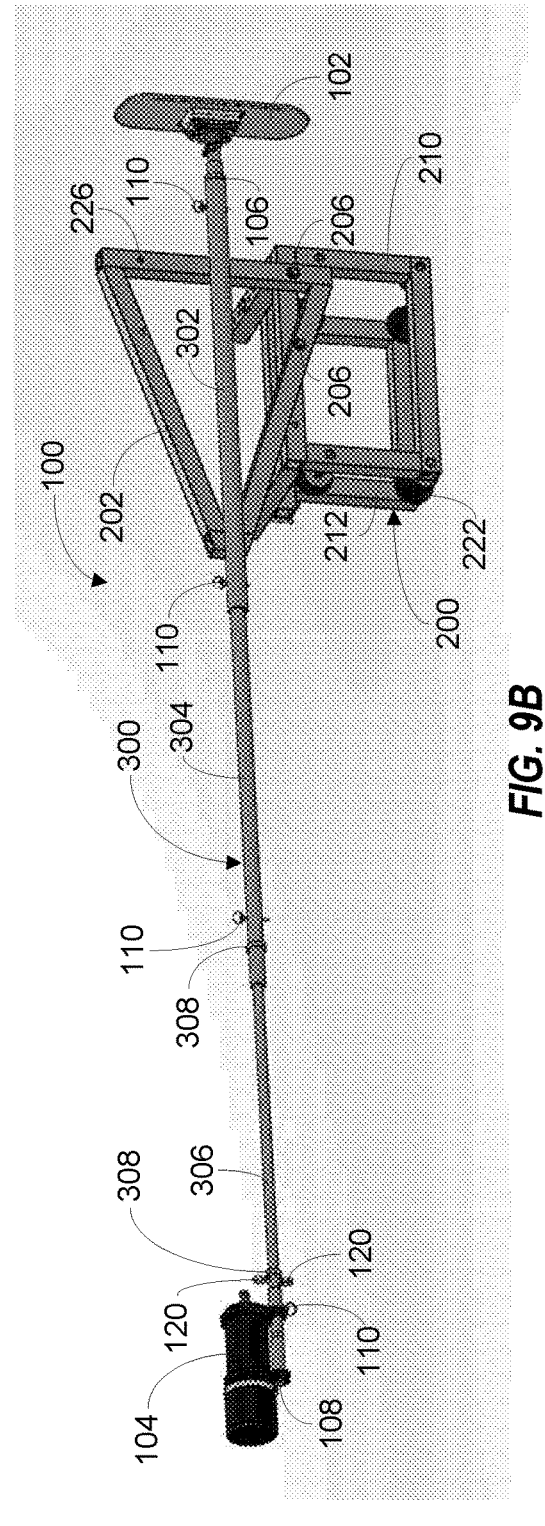
FIG. 9B is a perspective view of the system shown in FIG. 1 with sensors and attached in the horizontal and fully extended position, according to the present invention.

FIG. 9A is a perspective view of the system 100 shown in FIG. 1 without sensors 102 and 104 attached in the horizontal and fully extended position, according to the present invention. FIG. 9B is a perspective view of the system 100 shown in FIG. 1 with sensors 102 and 104 attached in the horizontal and fully extended position, according to the present invention. With the mounting frame assembly 200 attached to a marine vessel gunwale (not shown) the retractable pole assembly 300 may be freely rotated 90° clockwise from the vertical position shown in FIG. 1 to the horizontal position shown in FIG. 9B, without the air-based sensor 104 being obstructed by the marine vessel hull.

Figure 10:
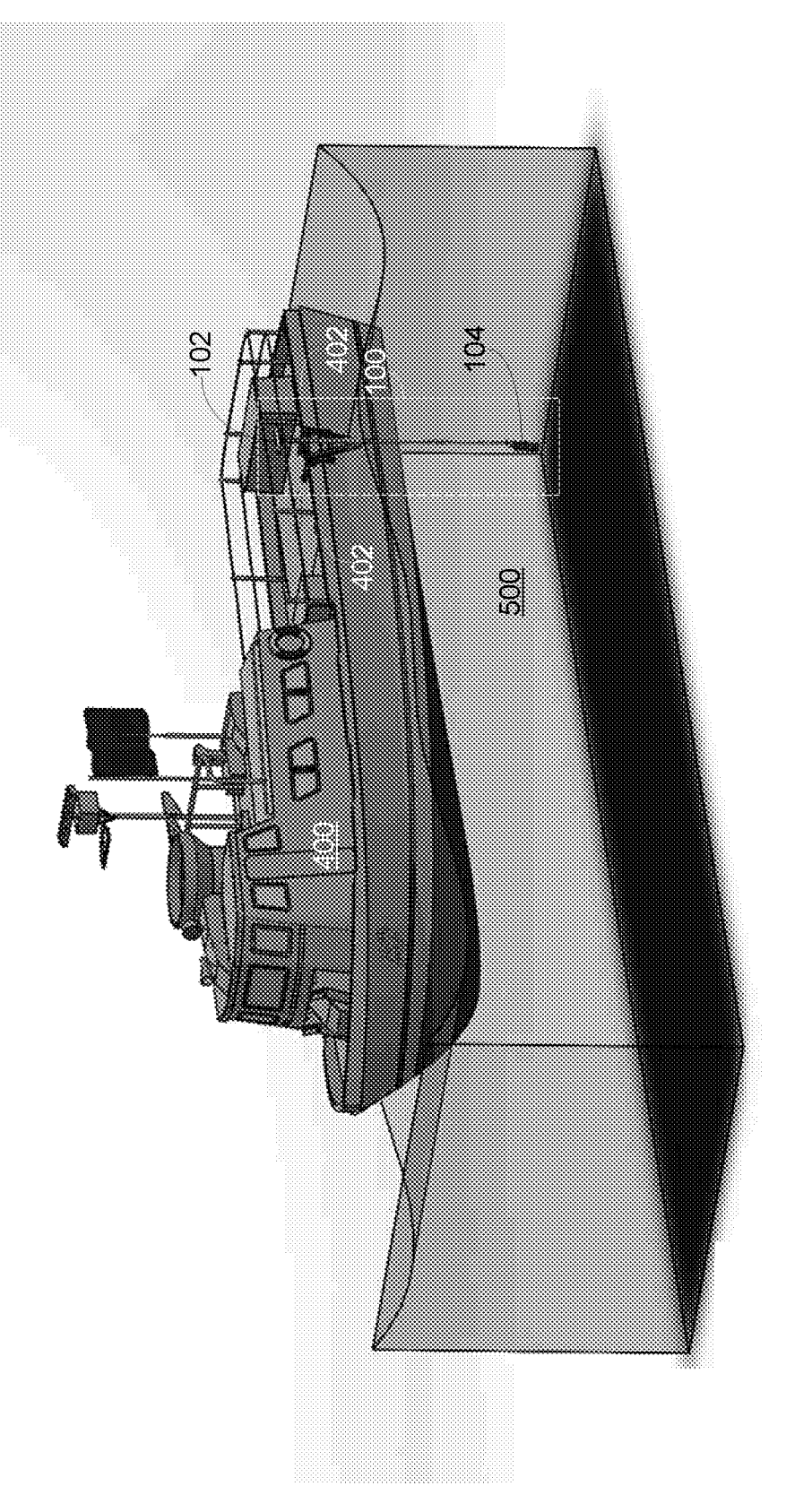
FIG. 10 is a perspective view of a marine vessel including the system shown in FIG. 1, shown inside dashed white rectangle, in the vertical fully extended position and installed along a gunwale with water-based sensor extending into the water, according to the present invention.

FIG. 10 is a perspective view of a marine vessel 400 including the system shown in FIG. 1, shown inside dashed white rectangle 100, in the vertical fully extended position and installed along a gunwale 402 with water-based sensor 104 extending into the water 500, according to the present invention. It will be understood that system 100 could be attached in any suitable location along gunwale 402 and on either port or starboard side of marine vessel 400 as the user may desire. Further enlarged views of system 100 installed on a gunwale 402 of a marine vessel 400 are described herein.

Figure 11:
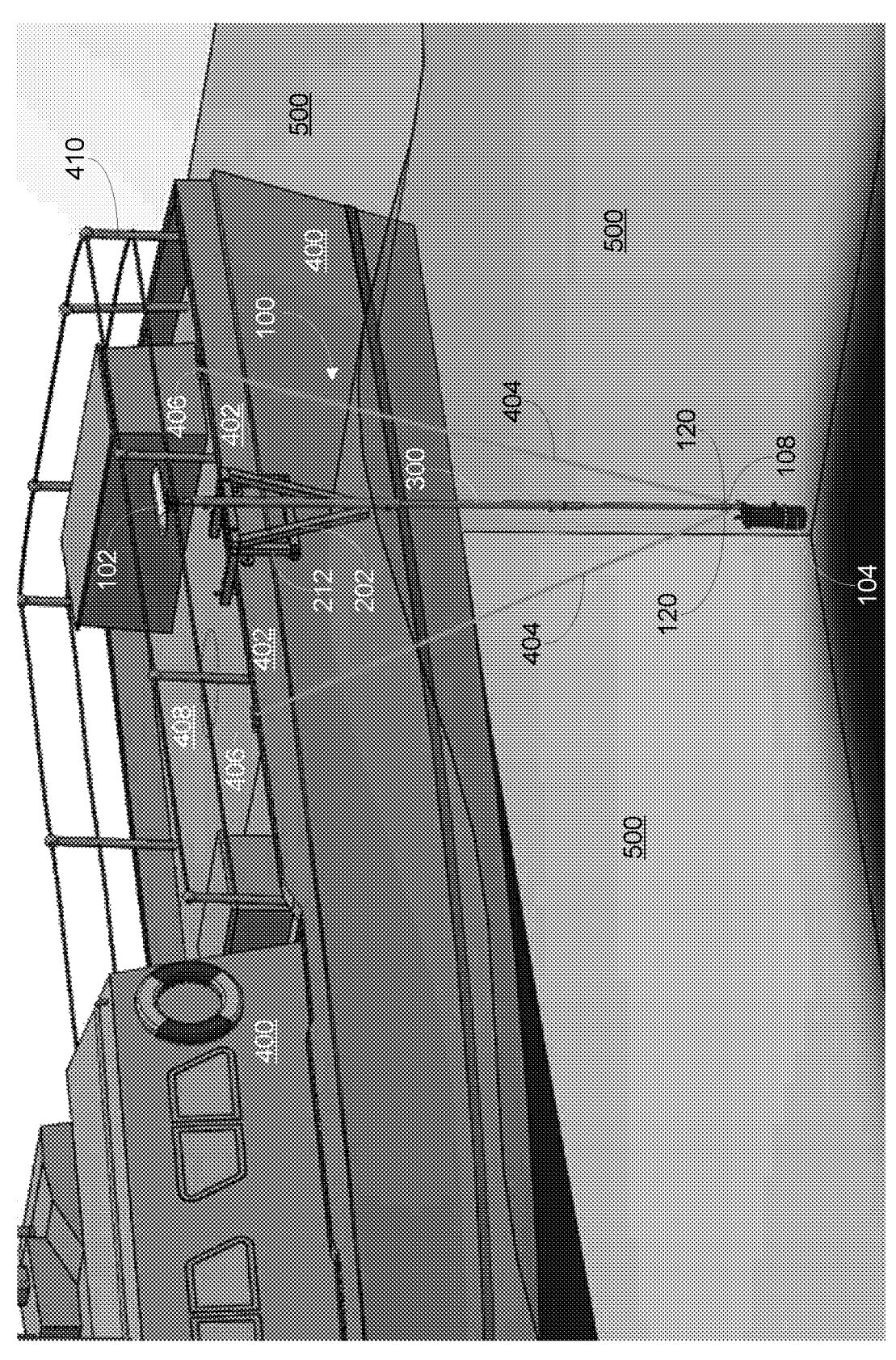
FIG. 11 is port-side enlarged view of the system with sensors shown in FIG. 10 mounted to the gunwale of a marine vessel and further secured with tie downs, according to the present invention.

FIG. 11 is an enlarged view of the system 100 shown in FIG. 10 mounted to the gunwale 402 of a marine vessel and further secured with tie downs 404, according to the present invention. As shown in FIG. 10, tie downs 404 may be used to stabilize and secure the retractable pole assembly 300 and water-based sensor 104 during use. More particularly, tie downs 404 may be secured to eyelets 120 and cleats 406 mounted to the tops of gunwale 402. Tie downs 404 may also be used to pivot the rotating frame 202 between the vertical position shown in FIG. 10 and horizontal, e.g., as shown FIG. 9B. Additional description and enlarged views of system 100 mounted to a marine vessel 400 gunwale 402 in various configurations are shown and described herein.

During heavy seas, a user may simply pivot the extended retractable pole assembly 300 and not bother retracting it and leave the water-based sensor 104 (e.g., USBL or other sensor) installed, but remove the air-base sensor 102, or optionally leave it if sufficiently reasonably splash-proof. The forward most tie down 404 (or tie down 404 opposite direction of pivot) could be used to secure the bottom end 108 the retractable pole assembly 300 by wrapping and tying it to some vessel structure (railing 410, another cleat 406, etc.) thereby limiting the flex in the retractable pole assembly 300. It will be understood that long poles with a heavy water-based sensor 104 at bottom end 108 and rough seas will result in pole flex and instability.

Figure 12:
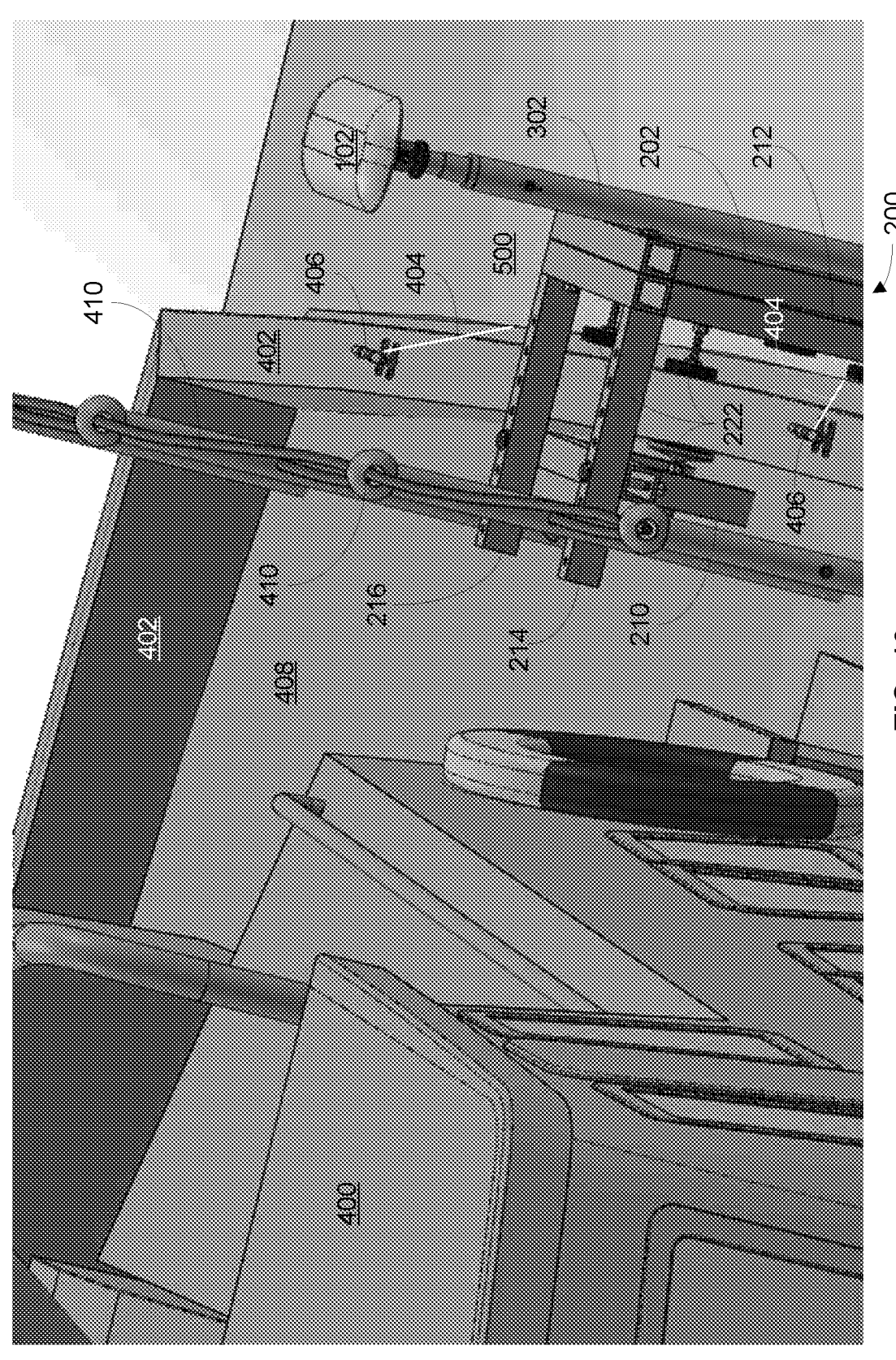
FIG. 12 is a top perspective view of the mounting frame assembly of the system shown in FIGS. 10 and 11 attached to a marine vessel gunwale, according to the present invention.

FIG. 12 is a top perspective view of the mounting frame assembly 200 of the system 100 shown in FIGS. 10 and 11 attached to a marine vessel 400 gunwale 402, according to the present invention. The view of FIG. 12 is particularly useful for illustrating how the inner 210 and outer 212 racks of the mounting frame assembly 200 surround the gunwale 402 and are held in place by swivel pads 222 (3 visible in FIG. 12). FIG. 12 also illustrates cleats 406 used with tie downs 404 to secure the bottom end 108 (not shown in FIG. 12) of the retractable pole assembly 300 from two lateral locations on gunwale 402. Installation, removal and pivoting of system 100 may be accomplished from the deck 408, even from behind railing 410, and inside gunwale 402 of marine vessel 400.

Figure 13:
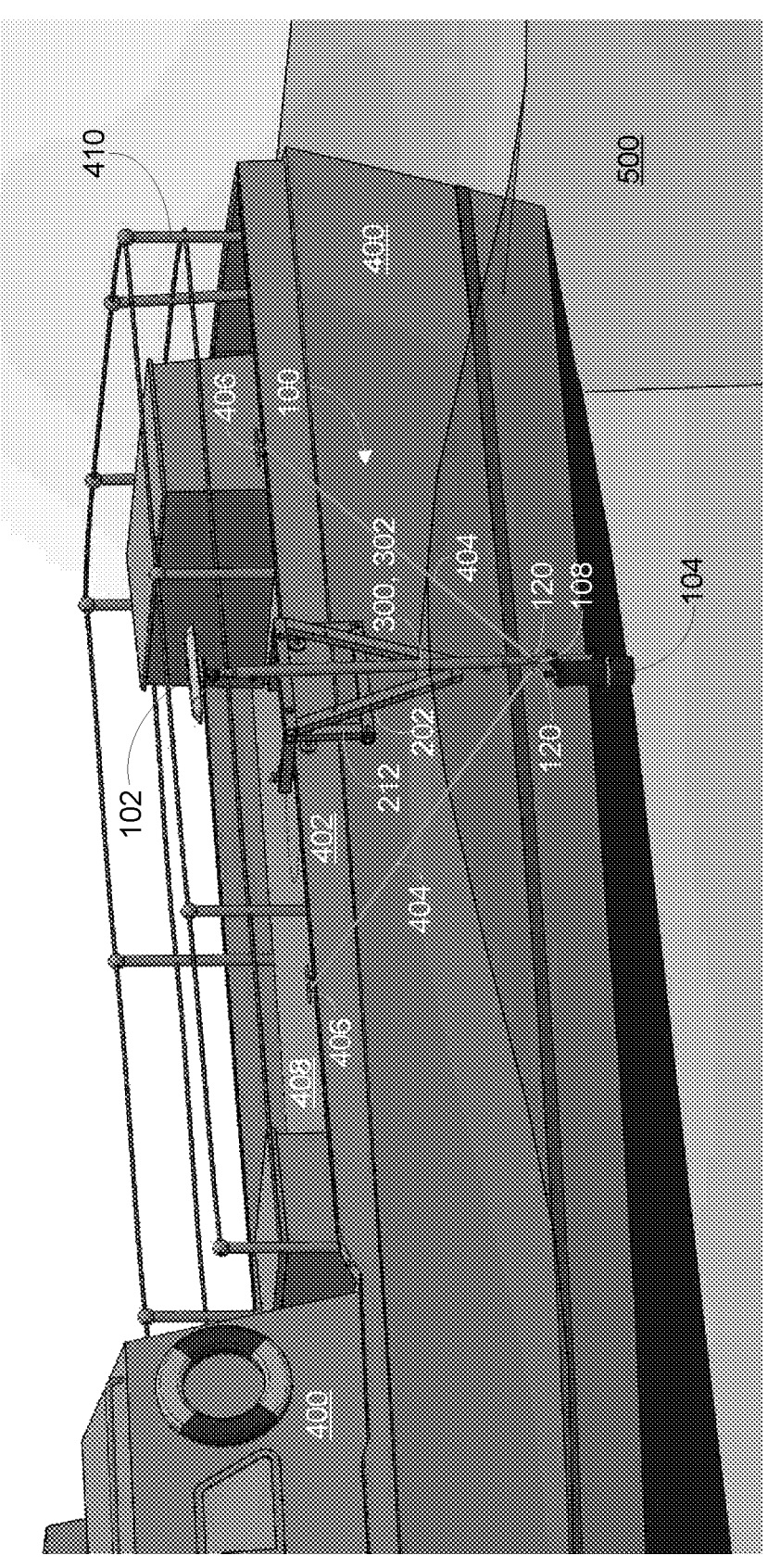
FIG. 13 is a port-side enlarged perspective view of the system shown in FIG. 11 mounted to a gunwale of a marine vessel in the vertical and retracted position with sensors and tie downs installed, according to the present invention.

FIG. 13 is a port-side enlarged perspective view of system 100 mounted to a gunwale 402 of a marine vessel 400 in the vertical and retracted position with sensors 102 and 104 and tie downs 404 installed, according to the present invention. As illustrated in FIG. 13, tie downs 404 may be used to stabilize and secure the bottom end 108 of retractable pole assembly 300. It will be understood that the retractable pole assembly 300 may be configured in any one of three possible positions, fully retracted (FIG. 13), fully extended (FIG. 10) and partially extended. The partially extended position, though not illustrated herein simply implies that either the lower 306 or middle 304 pole (but not both) is extended from the middle 304 or upper 302 pole, respectively. As already noted herein though, fully extended is presently preferred position for operational use in the context of tracking a UUV (not shown).

Figure 14A:
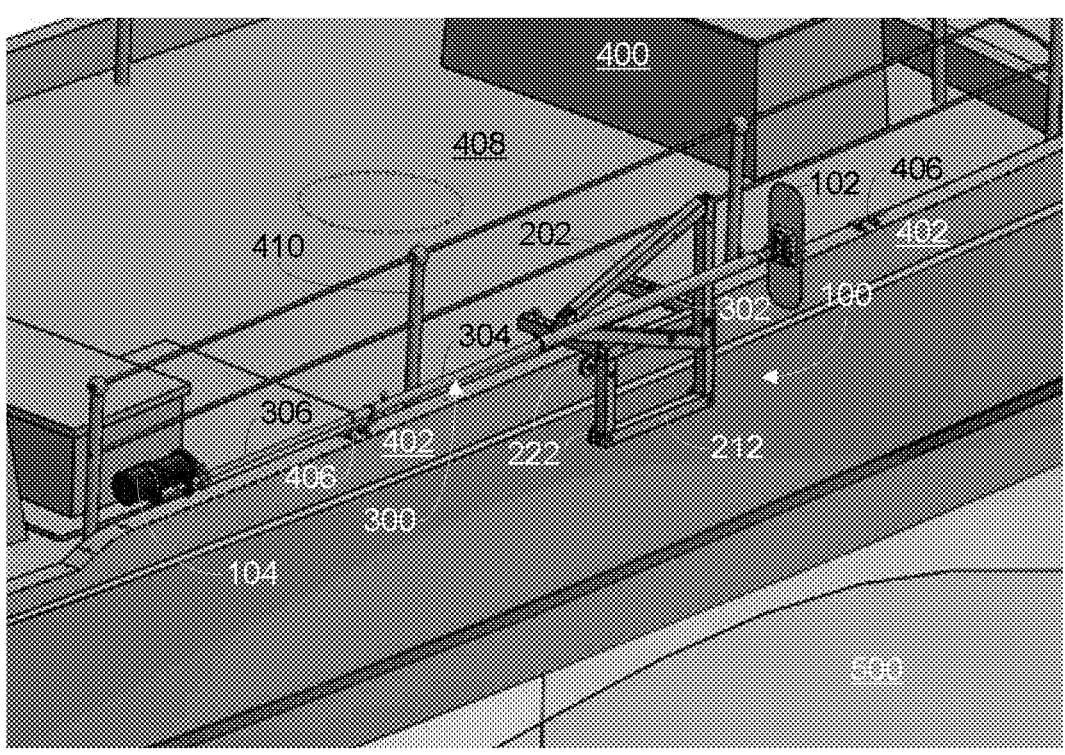
FIGS. 14A and 14B are a port-side enlarged perspective views of embodiment of the system shown in FIG. 1 mounted to a gunwale of a marine vessel in the horizontal and fully extended position with and without sensors and installed, respectively, according to the present invention.
Figure 14B:
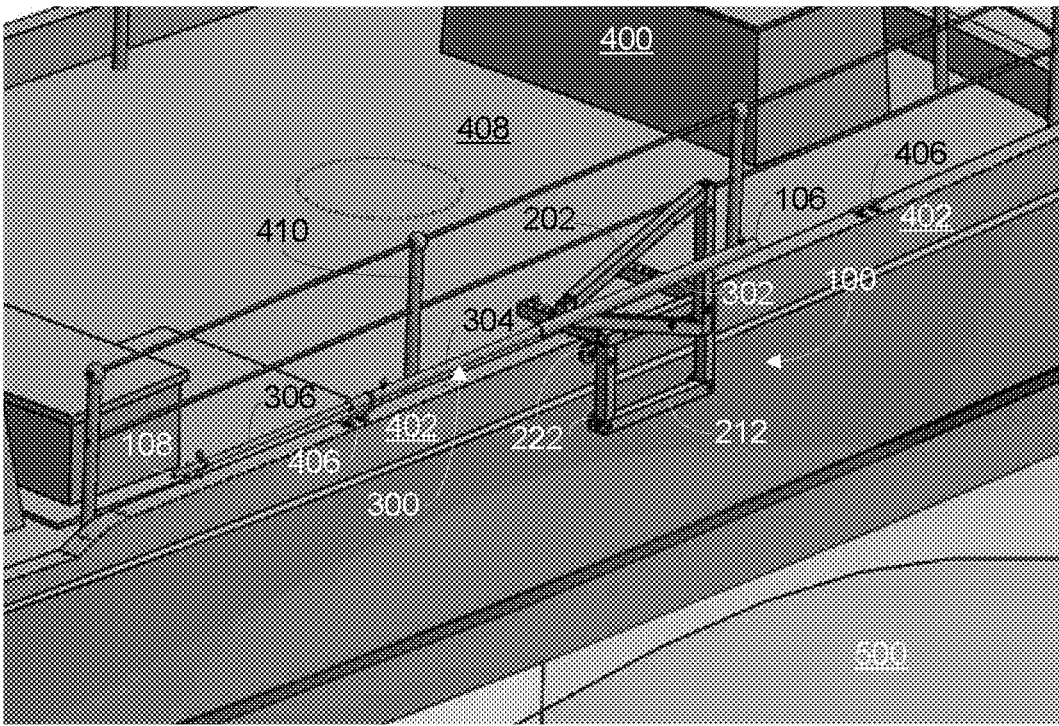

FIG. 14A is a port-side enlarged perspective view of an embodiment of system 100 mounted to a gunwale 402 of a marine vessel 400 in the horizontal and fully extended position with sensors 102 and 104 installed, according to the present invention. FIG. 14B is a port-side enlarged perspective view of an embodiment of system 100 mounted to a gunwale 402 of a marine vessel 400 in the horizontal and fully extended position without sensors installed, according to the present invention. Either configuration of system 100 in the horizontal position shown in FIGS. 14A and 14B may be useful for transportation to and from operational locations in the water, because the water sensor 104 is out of the water 500 and therefore not dragging in the water 500. It will be understood that in the horizontal and fully extended position of system 100 shown in FIGS. 14A and 14B, that sensors 102 and 104 may easily be installed or removed from their respective ends 106 and 108 of the retractable pole assembly 300 by a user from deck 408. Additionally, the extension or retraction of the retractable pole assembly 300 may be achieved from deck 408 in the horizontal position of system 100 illustrated in FIGS. 14A and 14B.

Figure 15A:
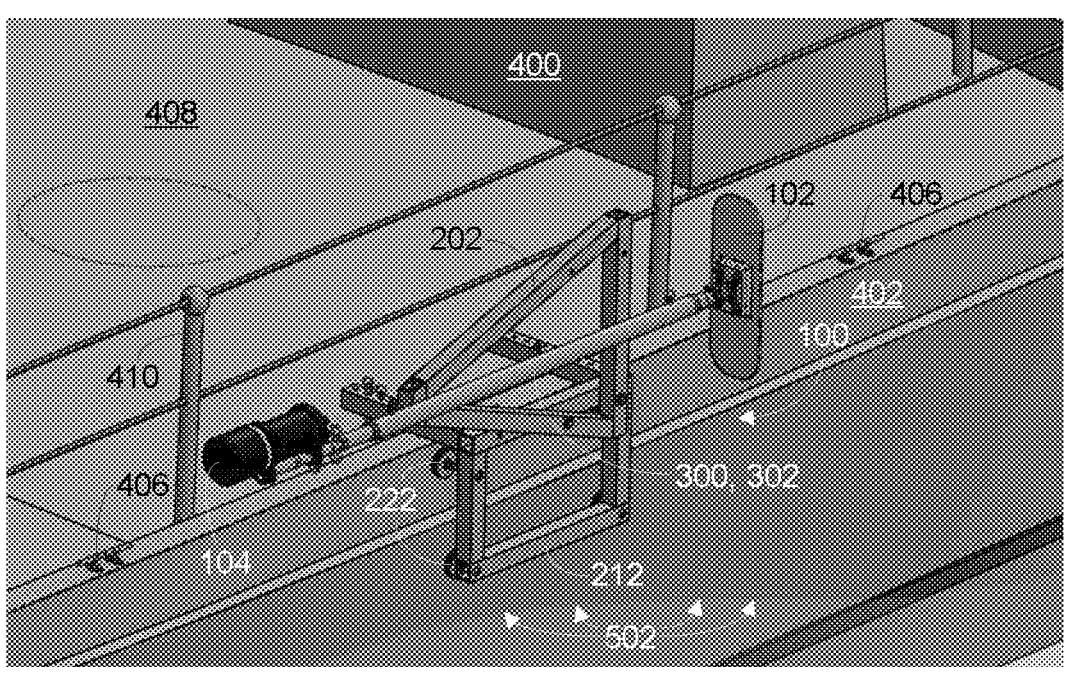
FIGS. 15A and 15B are enlarged perspective views of embodiments of system mounted to a gunwale of a marine vessel in the horizontal and fully retracted position with and without sensors, respectively, according to the present invention.
Figure 15B:
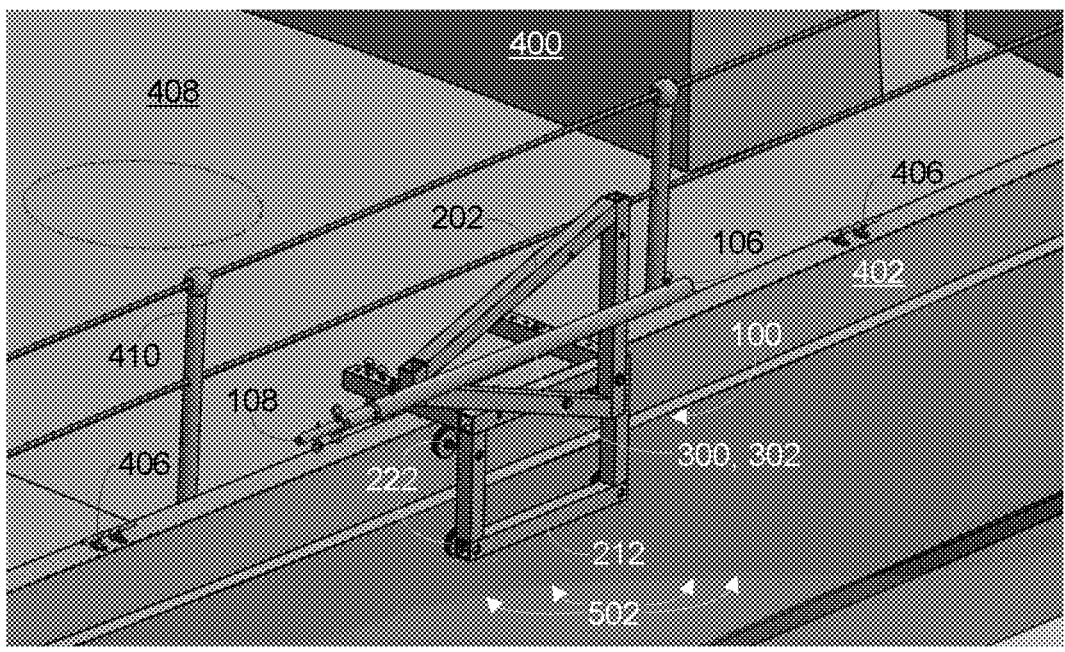

FIGS. 15A and 15B are enlarged perspective views of embodiments of system 100 mounted to a gunwale 402 of a marine vessel 400 in the horizontal and fully retracted position with and without sensors 102 and 104, respectively, according to the present invention. Either configuration of system 100 in the horizontal position shown in FIGS. 15A and 15B may be preferred and useful for transportation to and from operational locations in the water, because water sensor 104 is out of the water 500 and therefore not dragging in the water see faint water line, shown generally at arrows 502. It will be understood that in the horizontal and fully retracted position of system 100 shown in FIGS. 15A and 15B, that sensors 102 and 104 may easily be installed or removed from their respective ends 106 and 108 of the retractable pole assembly 300 by a user from deck 408. The fully retracted configurations of system 100, particularly the one in FIG. 15B, illustrate the most compact configurations preferred for transportation to and from operational locations as well as for stowing of system 100.

FIG. 16 is a flowchart of an embodiment of a method 600 for deploying air- and water-based sensors from a marine vessel 400, according to the present invention. Method 600 may include providing 602 a system 100 for deploying at least one of an air-based sensor 102 and a water-based sensor 104 from a marine vessel 400. It will be understood that system 100 may be any one of the system 100 embodiments disclosed herein. For example, system 100 may include a mounting frame assembly 200 configured for selectively mounting to a gunwale 402 of the marine vessel 400. The system 100 may further include a retractable pole assembly 300. The retractable pole assembly 300 may be any one of the embodiments of a retractable pole assembly 300 disclosed herein. For example, the retractable pole assembly 300 may include a top end 106 configured to selectively receive the air-based sensor 102. The retractable pole assembly 300 may further include a bottom end 108 configured to selectively receive the water-based sensor 104. The retractable pole assembly 300 may further be coupled to the mounting frame assembly 200.

Referring again to FIG. 16, method 600 may further include attaching 604 the mounting frame assembly 200 to the gunwale 402 of the marine vessel 400 with the retractable pole assembly 300 in a horizontal position. Method 600 may further include installing 606 the air-based sensor 102, or the water-based sensor 104 or both. Method 600 may further include extending 608 the retractable pole assembly 300 to a fully extended position. Method 600 may further include rotating 610 the retractable pole assembly 300 to a vertical position, wherein the water-based sensor 104 is submerged in water. Method 600 may further include operating 612 the air-based sensor 102, or the water-based sensor 104, or both to perform a mission.

According to another embodiment, method 600 may further include rotating the retractable pole assembly to a horizontal position. According to this embodiment, method 600 may further include retracting the retractable pole assembly to a fully retracted position. According to this embodiment, method 600 may further include removing the at least one of sensor 102, 104. According to this embodiment, method 600 may further include removing the mounting frame assembly from the gunwale of the marine vessel. According to this embodiment, method 600 may further include stowing the system.

According to yet another embodiment of method 600, the retractable pole assembly 300 further may further include a rotating frame 202 secured to the mounting frame assembly 200 using first and second locking and pivoting bolts 206, the first bolt 206 configured to be selectively and temporarily unlocked to allow pivoting of the rotating frame 202 about the second bolt 206 to achieve either a horizontal or a vertical position followed by being relocked. According to this embodiment, method 600 may further include an upper pole 302 attached to the rotating frame 202. According to this embodiment, method 600 may further include a middle pole 304 configured to retract within the upper pole 302. According to this embodiment, method 600 may further include a lower pole 306 configured to retract within the middle pole 304. According to this embodiment, method 600 may further include quick-release pins 110 configured to pass perpendicularly through, and to selectively secure, the poles 302, 304 and 306 in either a retracted or fully extended position. According to yet still another embodiment of method 600, the rotating frame 202 may be rotationally coupled to mounting frame assembly 200 with two pivoting and locking bolts 206.

According to still another embodiment of method 600, the mounting frame assembly 200 may further include a rectangular outer rack 212 configured with swivel pads 222 mounted at each corner of an inner surface the outer rack 212, each swivel pad 222 configured for fine lateral, adjustable contact with an outer surface of the gunwale 402. According to this embodiment of method 600, the mounting frame assembly 200 may further include left 214 and right 216 adjustment beams extending perpendicularly to the inner surface of the outer rack 212 and from a upper portion 228 of the outer rack 212, each of the beams 214 and 216 parallel to one another and included regularly spaced adjustment holes 218 for rough lateral adjustment. According to this embodiment of method 600, the mounting frame assembly 200 may further include a rectangular inner rack 210 configured with swivel pads 222 mounted at each corner of an outer surface of the inner rack 210, the inner rack 210 further configured for selective attachment to the left 214 and right 216 adjustment beams using the adjustment holes 218 such that the racks 210 and 212 are spaced apart from each other to form a space 220 for receiving, and friction fitting to, the gunwale 402.

Having described various system 100 and method 600 embodiments of the invention with particularity and reference to the drawings, some additional generic embodiments are described in the following detailed description. An embodiment of a system for deploying air-based and water-based sensors from a marine vessel is disclosed. This system may include a mounting frame assembly configured for selectively mounting to a gunwale of the marine vessel. This system may further include a retractable pole assembly having a top end and a bottom end. The retractable pole assembly may be coupled to the mounting frame assembly and be configured to selectively receive an air-based sensor at the top end and a water-based sensor at the bottom end. According to another embodiment of a system for deploying air-based and water-based sensors from a marine vessel, the mounting frame assembly may be configured to clamp to both sides and over a top of the marine vessel gunwale.

According to a particular embodiment of a system for deploying air-based and water-based sensors from a marine vessel, the mounting frame assembly may further include an outer rack configured with a first plurality of swivel pads, each of the pads configured for adjustable contact with an outer surface of the gunwale. According to this particular embodiment, the mounting frame assembly may further include left and right adjustment beams extending perpendicularly from a top portion of the outer rack and parallel to one another. According to this particular embodiment, the mounting frame assembly may further include an inner rack configured with a second plurality of swivel pads, each of the pads configured for adjustable contact with an inner surface of the gunwale, a top portion of the inner rack further configured for selective attachment to the left and right adjustment beams such that the racks are spaced apart from each other to form a space for receiving the gunwale. According to yet another embodiment, each of the left and the right adjustment beams may further include regularly spaced adjustment holes for mounting to the top portion of the inner rack via nuts and bolts. According to yet another embodiment, the mounting frame assembly may be laterally adjustable for gunwale thickness via the regularly spaced adjustment holes for rough adjustment and the first and the second plurality of swivel pads for fine adjustment.

According to one embodiment of a system for deploying air-based and water-based sensors from a marine vessel, the retractable pole assembly may further include an upper pole, a retractable middle pole configured to slide axially relative to the upper pole and a retractable lower pole configured to slide axially relative to the middle pole. According to another embodiment, the retractable pole assembly may further include a rotating frame fixed to the upper pole. According to this embodiment, the rotating frame may be configured for rotational coupling to the mounting frame assembly. According to yet another embodiment, the retractable pole assembly may further include a quick-release pin configured for selectively locking or unlocking the rotating frame assembly relative to the outer rack of the mounting frame assembly in lieu of one of two pivoting and locking bolts. According to yet another embodiment, the retractable pole assembly may further be rotationally coupled to the mounting frame assembly between vertical and horizontal positions.

According to still another embodiment of a system for deploying air-based and water-based sensors from a marine vessel, the mounting frame assembly may further include a plurality of laterally adjustable swivel pads for contacting both sides of the gunwale to achieve a friction fit. According to a particular embodiment of the system, the retractable pole assembly may extend in length from out of the water when fully retracted to about 3 m under water fully extended. According to other embodiments of the system, the retractable middle pole may be configured to slide within the upper pole and the retractable lower pole may be configured to slide within the retractable middle pole. According to yet another embodiment, the system may further include quick-release pins configured for selectively locking or unlocking the retractable pole assembly in either retracted or fully extended positions. According to still more embodiments of the system, the air-based sensor may be a global navigation satellite system (GNSS) receiver and the water-based sensor may be an ultra-short baseline (USBL) underwater acoustic sensor.

An embodiment of a method for deploying air- and water-based sensors from a marine vessel is disclosed. The method may include providing a system for deploying at least one of an air-based sensor and a water-based sensor from a marine vessel. According to one embodiment, the deployable system may include a mounting frame assembly configured for selectively mounting to a gunwale of the marine vessel. According to this particular embodiment, the deployable system may further include a retractable pole assembly. One embodiment of the retractable pole assembly may include a top end configured to selectively receive the air-based sensor. This embodiment of the retractable pole assembly may further include a bottom end configured to selectively receive the water-based sensor. This embodiment of the retractable pole assembly may further include the retractable pole assembly coupled to the mounting frame assembly. The method may further include attaching the mounting frame assembly to the gunwale of the marine vessel with the retractable pole assembly in a horizontal position. The method may further include installing the at least one of the air-based sensor and the water-based sensor. The method may further include extending the retractable pole assembly to a fully extended position. The method may further include rotating the retractable pole assembly to a vertical position, wherein the water-based sensor is submerged in water.

According to another embodiment, the method for deploying air- and water-based sensors from a marine vessel may further include operating the at least one of the air-based sensor and the water-based sensor to perform a mission. According to yet another embodiment, the method may further include rotating the retractable pole assembly to a horizontal position. According to this particular embodiment, the method may further include retracting the retractable pole assembly to a fully retracted position. According to this particular embodiment, the method may further include removing the at least one of the air-based sensor and the water-based sensor. According to this particular embodiment, the method may further include removing the mounting frame assembly from the gunwale of the marine vessel. According to this particular embodiment, the method may further include stowing the system.

According to one embodiment of the method for deploying air- and water-based sensors from a marine vessel, the retractable pole assembly may further include a rotating frame secured to the mounting frame assembly using first and second locking and pivoting bolts, the first bolt configured to be selectively and temporarily unlocked to allow pivoting of the rotating frame about the second bolt to achieve either a horizontal or a vertical position followed by being relocked. According to this particular embodiment, the retractable pole assembly may further include an upper pole attached to the rotating frame. According to this particular embodiment, the retractable pole assembly may further include a middle pole configured to retract within the upper pole. According to this particular embodiment, the retractable pole assembly may further include a lower pole configured to retract within the middle pole. According to this particular embodiment, the retractable pole assembly may further include quick-release pins configured to pass perpendicularly through, and to selectively secure, the poles in either a retracted or fully extended position.

According to still yet another embodiment of the method for deploying air- and water-based sensors from a marine vessel, the rotating frame may be rotationally coupled to the mounting frame assembly with both the first and the second pivoting and locking bolts, or with one of the quick-release pins and one of the two pivoting and locking bolts. According to one embodiment of the method, the rotating frame may be rotationally coupled to mounting frame assembly with either one of the first and the second pivoting and locking bolts and one quick-release pin to secure the system in either the horizontal or the vertical positions.

According to another embodiment of the method for deploying air- and water-based sensors from a marine vessel, the mounting frame assembly may further include a rectangular outer rack configured with swivel pads mounted at each corner of an inner surface of the outer rack, each of the swivel pads configured for fine lateral adjustable contact with an outer surface of the gunwale. According to this embodiment, the mounting frame assembly may further include left and right adjustment beams extending perpendicularly to the inner surface of the outer rack and from a top portion of the outer rack with each of the beams parallel to one another and including regularly spaced adjustment holes for rough lateral adjustment. According to this embodiment, the mounting frame assembly may further include a rectangular inner rack configured with swivel pads mounted at each corner of an outer surface of the inner rack, the inner rack further configured for selective attachment to the left and right adjustment beams using the adjustment holes such that the racks are spaced apart from each other to form a space for receiving, and friction fitting to, the gunwale. According to still yet another embodiment, the swivel pads may be configured to swivel such that the swivel pads can make secure contact to inner and outer gunwale surfaces that are neither planar nor parallel to one another.

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed.

From the above description of the embodiments of the portable retractable system 100 and method 600 for deploying water-based and air-based sensors, it is manifest that various alternative structures and method steps may be used for implementing features of the present invention without departing from the scope of the claims. The described embodiments are to be considered in all respects as illustrative and not restrictive. It will further be understood that the present invention may suitably comprise, consist of, or consist essentially of the component parts, method steps and limitations disclosed herein. The method and/or apparatus disclosed herein may be practiced in the absence of any element that is not specifically claimed and/or disclosed herein.

While the foregoing advantages of the present invention are manifested in the detailed description and illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. A system for deploying air-based and water-based sensors from a marine vessel, the system comprising:
   a mounting frame assembly configured for selectively mounting to a gunwale of the marine vessel;
   a retractable pole assembly having a top end and a bottom end, the retractable pole assembly coupled to the mounting frame assembly and configured to selectively receive an air-based sensor at the top end and a water-based sensor at the bottom end; and
   wherein the retractable pole assembly is rotationally coupled to the mounting frame assembly between vertical and horizontal positions.

2. The system according to claim 1, wherein the mounting frame assembly is configured to clamp to both sides and over a top of the gunwale.

3. The system according to claim 1, wherein the mounting frame assembly further comprises:
   an outer rack configured with a first plurality of swivel pads, each of the first plurality of pads configured for adjustable contact with an outer surface of the gunwale;
   left and right adjustment beams extending perpendicularly from a top portion of the outer rack and parallel to one another; and
   an inner rack configured with a second plurality of swivel pads, each of the second plurality of pad configured for adjustable contact with an inner surface of the gunwale, a top portion of the inner rack further configured for selective attachment to the left and right adjustment beams such that the racks are spaced apart from each other to form a space for receiving the gunwale.

4. The system according to claim 3, wherein each of the left and the right adjustment beams further comprise regularly spaced adjustment holes for mounting to the top portion of the inner rack via nuts and bolts.

5. The system according to claim 4, wherein the mounting frame assembly is laterally adjustable for gunwale thickness via the regularly spaced adjustment holes for rough adjustment and the first and the second plurality of swivel pads for fine adjustment.

6. The system according to claim 1, wherein the retractable pole assembly further comprises an upper pole, a retractable middle pole configured to slide axially relative to the upper pole and a retractable lower pole configured to slide axially relative to the middle pole.

7. The system according to claim 6, wherein the retractable pole assembly further comprises a rotating frame fixed to the upper pole, the rotating frame configured for rotational coupling to the mounting frame assembly.

8. The system according to claim 7, further comprising a quick-release pin configured for selectively locking or unlocking the rotating frame assembly relative to the outer rack of the mounting frame assembly in lieu of one of two pivoting and locking bolts.

9. The system according to claim 1, wherein the mounting frame assembly further comprises a plurality of laterally adjustable swivel pads for contacting both sides of the gunwale to achieve a friction fit.

10. The system according to claim 1, wherein the retractable pole assembly may extend in length from out of the water when fully retracted to about 3 m under water fully extended.

11. The system according to claim 6, wherein the retractable middle pole is configured to slide within the upper pole and the retractable lower pole is configured to slide within the retractable middle pole.

12. The system according to claim 1, further comprising quick-release pins configured for selectively locking or unlocking the retractable pole assembly in either retracted or fully extended positions.

13. The system according to claim 1, wherein the air-based sensor is a global navigation satellite system (GNSS) receiver and the water-based sensor is an ultra-short baseline (USBL) underwater acoustic sensor.

14. A method for deploying air- and water-based sensors from a marine vessel, the method comprising:
   providing a system for deploying an air-based sensor and a water-based sensor from a marine vessel, the system comprising:
      a mounting frame assembly configured for selectively mounting to a gunwale of the marine vessel; and
      a retractable pole assembly rotationally coupled to the mounting frame assembly between a vertical position and a horizontal position, the retractable pole assembly further comprising:
         a top end configured to selectively receive the air-based sensor; and
         a bottom end configured to selectively receive the water-based sensor;
   attaching the mounting frame assembly to the gunwale of the marine vessel with the retractable pole assembly in the horizontal position;
   installing the air-based sensor and the water-based sensor;
   extending the retractable pole assembly from a fully retracted position to a fully extended position; and
   rotating the retractable pole assembly to the vertical position, wherein the water-based sensor is submerged in water.

15. The method according to claim 14, further comprising operating the air-based sensor and the water-based sensor to perform a mission.

16. The method according to claim 14, further comprising:
   rotating the retractable pole assembly to the horizontal position;
   retracting the retractable pole assembly to the fully retracted position;
   removing the air-based sensor and the water-based sensor;
   removing the mounting frame assembly from the gunwale of the marine vessel; and
   stowing the system.

17. The method according to claim 14, wherein the retractable pole assembly further comprises:
   a rotating frame secured to the mounting frame assembly using first and second locking and pivoting bolts, the first bolt configured to be selectively and temporarily unlocked to allow pivoting of the rotating frame about the second bolt to achieve either the horizontal or the vertical position followed by being relocked;
   an upper pole attached to the rotating frame;
   a middle pole configured to retract within the upper pole;
   a lower pole configured to retract within the middle pole; and quick-release pins configured to pass perpendicularly through, and to selectively secure, the poles in either the fully retracted position or the fully extended position.

18. The method according to claim 17, wherein the rotating frame is rotationally coupled to the mounting frame assembly with both the first and the second pivoting and locking bolts, or with one of the quick-release pins and one of the two pivoting and locking bolts.

19. The method according to claim 17, wherein the rotating frame is rotationally coupled to mounting frame assembly with either one of the first and the second pivoting and locking bolts and one quick-release pin to secure the system in either the horizontal or the vertical positions.

20. The method according to claim 14, wherein the mounting frame assembly further comprises:

a rectangular outer rack configured with swivel pads mounted at each corner of an inner surface of the outer rack, each of the swivel pads configured for fine lateral adjustable contact with an outer surface of the gunwale;

left and right adjustment beams extending perpendicularly to the inner surface of the outer rack and from a top portion of the outer rack with each of the beams parallel to one another and including regularly spaced adjustment holes for rough lateral adjustment; and a rectangular inner rack configured with swivel pads mounted at each corner of an outer surface of the inner rack, the inner rack further configured for selective attachment to the left and right adjustment beams using the adjustment holes such that the racks are spaced apart from each other to form a space for receiving, and friction fitting to, the gunwale.

21. The method according to claim 20, wherein the swivel pads are configured to swivel such that the swivel pads can make secure contact to inner and outer gunwale surfaces that are neither planar nor parallel to one another.

* * * * *